A. ALVAREZ.
CAN SOLDERING MACHINE.
APPLICATION FILED DEC. 28, 1916.

1,396,011.

Patented Nov. 8, 1921.
3 SHEETS—SHEET 1.

WITNESS.
J. D. Thornburgh.

INVENTOR.
Antonio Alvarez
BY
ATTORNEY.

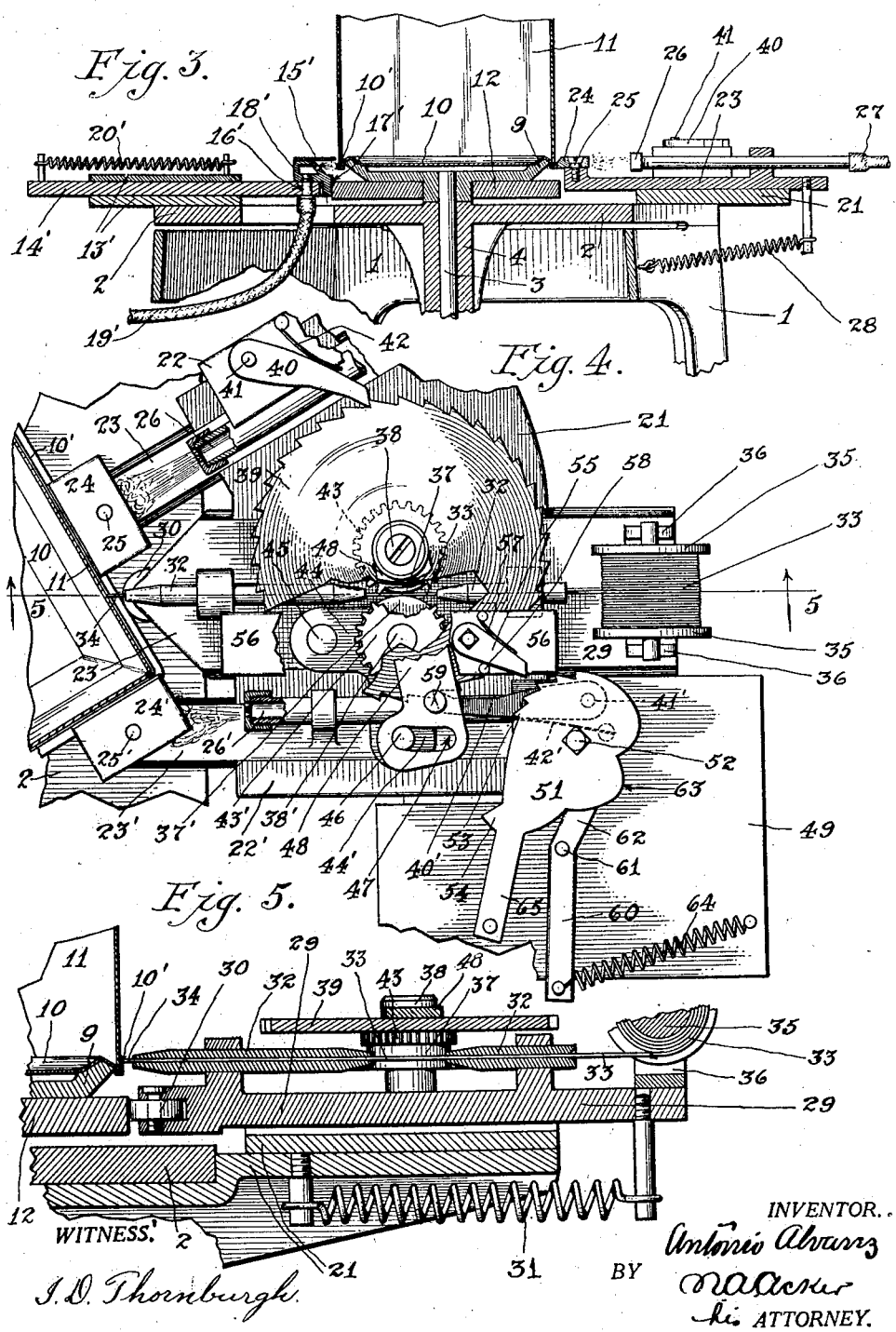

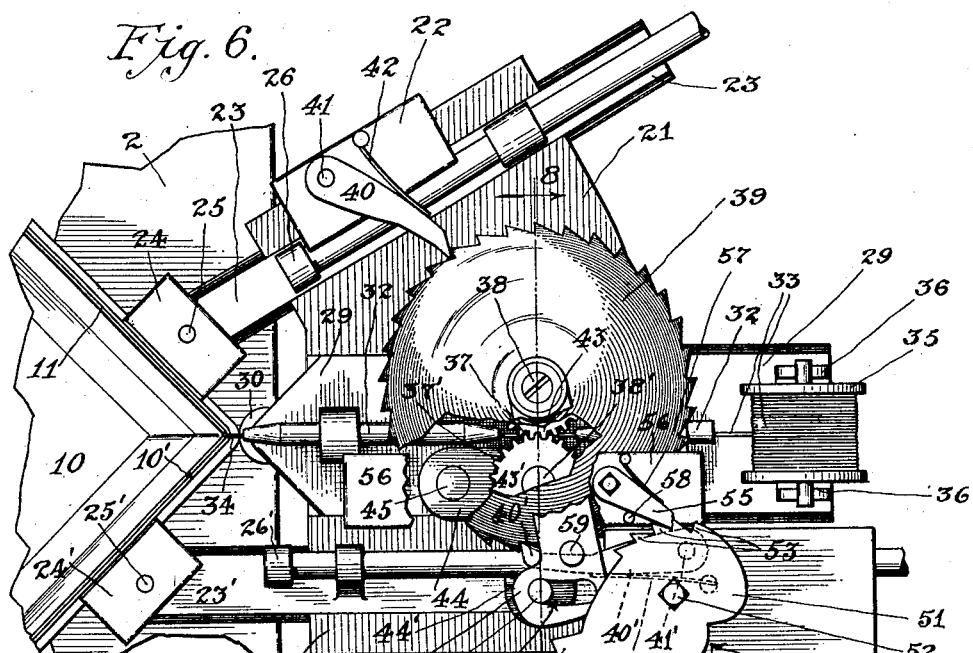

UNITED STATES PATENT OFFICE.

ANTONIO ALVAREZ, OF BERKELEY, CALIFORNIA, ASSIGNOR TO AMERICAN CAN COMPANY, OF SAN FRANCISCO, CALIFORNIA, A CORPORATION OF NEW JERSEY.

CAN-SOLDERING MACHINE.

1,396,011. Specification of Letters Patent. Patented Nov. 8, 1921.

Application filed December 28, 1916. Serial No. 139,340.

*To all whom it may concern:*

Be it known that I, ANTONIO ALVAREZ, a citizen of the United States, residing at Berkeley, in the county of Alameda and State of California, have invented certain new and useful Improvements in Can-Soldering Machines, of which the following is a specification.

The present invention relates to a machine for soldering cans, and more particularly for soldering the seam between the end and the body of the can.

The object of the invention is to provide a machine of the described type in which the solder is automatically fed in the proper amount to complete the seam, and cut off upon the completion of said seam. A further object is to provide a machine in which all the operations, with the exception of feeding and discharging the cans, are automatically performed by mechanism simple in construction and efficient in operation.

The preferred form of the machine hereinafter described and herewith illustrated is adapted for soldering ends upon square or rectangular cans. However, by means of simple changes in the details of construction, the machine may be adapted to operate upon other types of cans, or upon any other objects requiring a soldered or fused seam of the same general type, it being understood that the term "solder" is used to signify any fusible seaming material capable of being applied in the described manner. Inasmuch as such changes may be made in the form and construction of the machine, without departing from the spirit of the invention, it is my wish to be understood as claiming the invention, in the claims hereto appended, as broadly as the state of the art will permit.

In order to comprehend the invention, reference should be had to the accompanying drawings, wherein—

Fig. 3 is a part-sectional view, taken in the direction of the arrows on the line 3—3 of Fig. 1.

Fig. 4 is a partly broken plan view, enlarged, of the solder feed mechanism and the seaming irons, the former being shown in its initial position, that is, at the beginning of a seaming operation.

Fig. 5 is a vertical sectional view, taken in the direction of the arrows on the line 5—5 of Fig. 4.

Fig. 6 is a view similar to that disclosed by Fig. 4 of the drawings, showing the feed mechanism in a slightly advanced position.

Fig. 7 is a similar view of a portion of the feed mechanism, showing the same in its final position, that is, at the end of the seaming operation.

Fig. 8 is a vertical section of the solder feed mechanism, taken in the direction of the arrows on the line 8—8 of Fig. 6.

Figure 1:
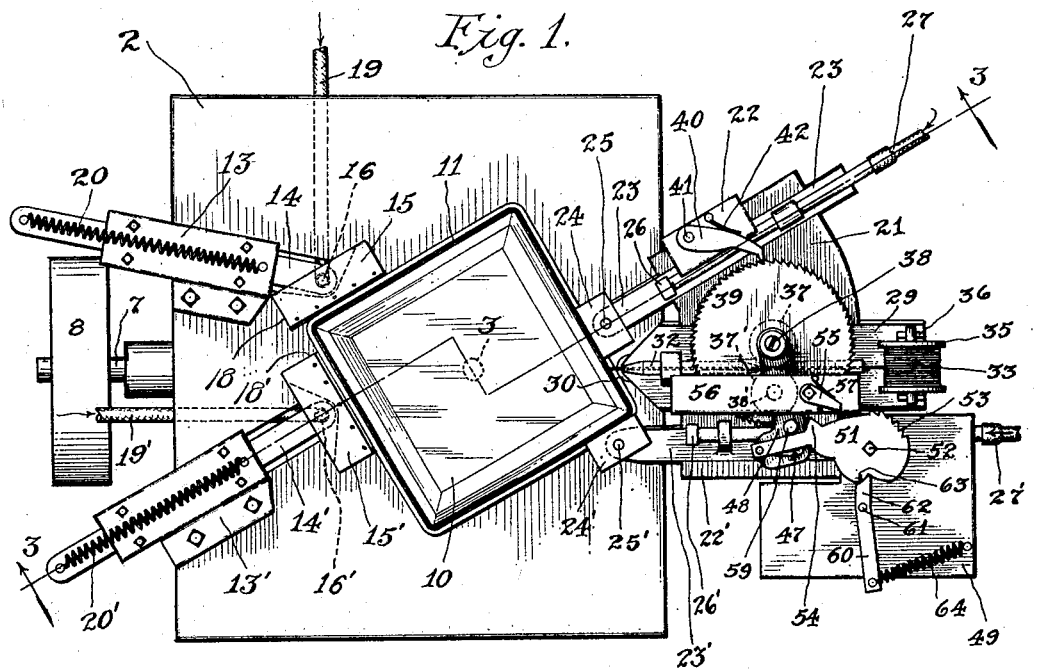
Figure 1 is a plan view of the machine, showing a can in position to be soldered.

In the drawings, the reference numeral 1 designates a suitably constructed base, upon which is mounted a horizontal table or bed plate 2. A vertically disposed shaft 3, Fig. 3 of the drawings, is suitably journaled at 4 in a bracket carried by the bed plate 2. Said shaft carries upon its lower end a bevel gear 5—Fig. 2 of the drawings, adapted to mesh with and be driven by a similar gear 6 carried upon a horizontally disposed drive shaft 7, the latter being provided with means for receiving power from an outside source, not shown in the drawings, as, for example, a pulley 8.

Figure 2:
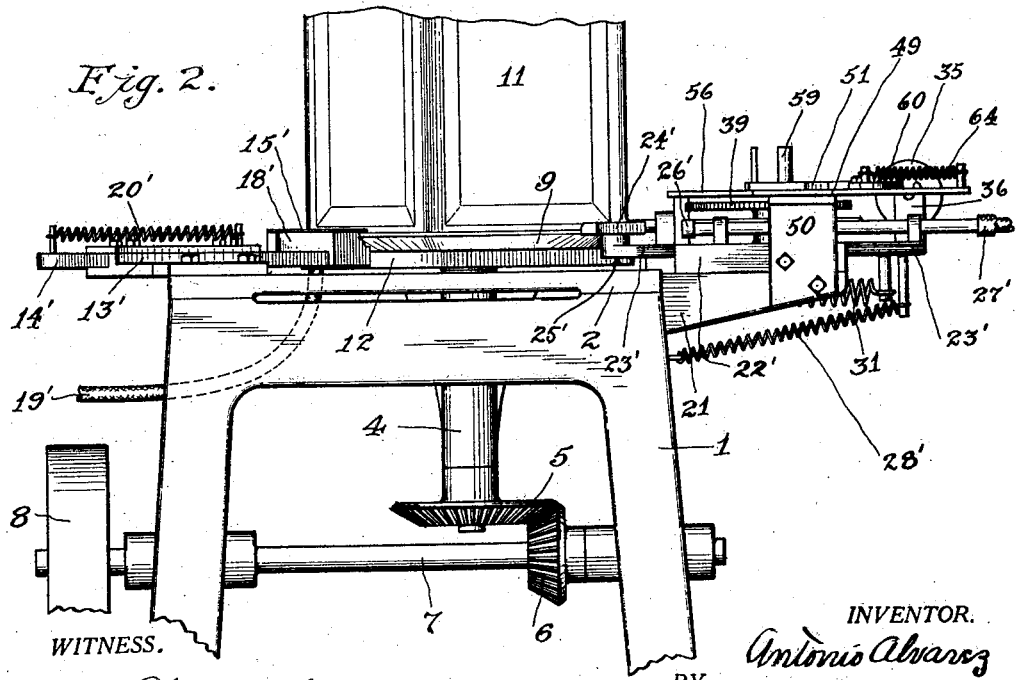
Fig. 2 is a side elevation of the same.

The vertical shaft 3 carries upon its upper end, above the bed plate 2, a can holding chuck 9, Figs. 2 and 3 of the drawings, said chuck being properly formed to engage and hold the end or bottom 10 of the can 11 and to support the same thereby. The vertical shaft 3 also carries a horizontally disposed cam 12—Figs. 2, 3 and 5 of the drawings, immediately below the chuck 9. The cam 12 in shape conforms to the outline of the bottom of the can 11 and is therefore similar in contour to the seam 10' to be soldered, said seam being in the present case at the joint between the can end 10 and the can body 11. The cam 12, as herewith illustrated, is substantially the same in size as the can 11.

Mounted upon the bed plate 2 at one side of the machine are a pair of angularly disposed brackets 13 and 13'—Fig. 1 of the drawings. Within said brackets and held thereby for horizontal sliding movement, are slides 14 and 14' respectively, one of said slides being shown in Fig. 3 of the drawings. Said slides 14 and 14' carry upon their inner ends burner heads 15 and 15', the latter being pivotally connected with said slides at 16 ad 16' respectively, and each having a cam following face, one of which is illustrated at 17' in Fig. 3 of the drawings, said faces being adapted to engage and follow the cam 12. Said burner heads are also provided with burners 18 and 18', one being illustrated in Fig. 3 of the drawings, adapted to direct flame jets upon the seam 10' to be soldered. Gaseous fuel is supplied to the burners by means of flexible tubes 19 and 19', and the hollow pivotal connections 16 and 16' between said burner heads and their respective slides. Springs 20 and 20' are provided for holding the burner heads in contact with the cam 12.

It will readily be seen that on account of the pivotal mounting of the burner heads 15 and 15', and the sliding movement of their carrier members 14 and 14', said burner heads will follow the contour of the seam 10' and will heat the same with the least possible waste of fuel.

On the opposite side of the machine is mounted a bracket 21, the same being fixed to and extending laterally from the upper portion of the base 1. Upon said bracket, at one side thereof, is carried a suitably formed guide member 22—Fig. 1 of the drawings, in which is slidably mounted a slide bar 23 carrying upon its inner end an ironing plate 24, the same being pivotally connected at 25 with said slide bar 23, as shown in Figs. 1 and 3 of the drawings. The slide bar 23 has mounted thereupon a burner 26—Figs. 1, 3 and 4 of the drawings, said burner being adapted to direct a jet of flame against the rear surface of the ironing plate 24. The burner 26 is connected with a flexible gas supply tube 27, as shown in Figs. 1 and 3 of the drawings.

A similar slide bar 23', Figs. 1, 2 and 4 of the drawings, is carried within suitably formed guides 22' mounted upon the bracket 21 on the opposite side thereof from the guide 22. Said slide bar 23' carries an ironing plate 24' pivotally connected therewith at 25', and a burner 26', the latter being supplied with gas through a flexible tube 27' and adapted to direct a jet of flame against the rear surface of the ironing plate 24'. The ironing plates 24 and 24' are adapted to bear against the seam 10' of the can and are held in this relation by springs 28 and 28'—Figs. 2 and 3 of the drawings, said springs acting to draw the slide bars 23 and 23' inwardly. The ironing plates 24 and 24', being heated by their respective burners 26 and 26', iron the seam as the fusible solder is applied thereto. The bracket 21 carries, between the ironing slides previously described, a sliding member 29—Figs. 1, 4 and 5 of the drawings, said sliding member being suitably mounted in said bracket 21 and adaptably mounted for sliding movement therein in a direction radial with respect to the chuck 9. The inner end of said sliding member 29 carries a cam following roller 30—Figs. 1 and 5, adapted to follow the cam 12, and a spring 31—Figs. 2 and 5, holds said cam follower 30 in contact with said cam 12 so that the slide 29 is given a reciprocating motion by the rotation of said cam. Carried upon the slide 29 are tubular guide members 32—Figs. 4 and 5, through which is passed, in the form of a wire 33, the fusible metal, said guides 32 being so positioned that the end 34 of the fusible solder wire bears against the seam 10' of the can. Said solder wire 33 is preferably carried upon a suitable reel or spool 35 mounted upon brackets 36 carried by the slide 29.

A pair of solder feed rolls 37 and 37'—Figs. 1, 4 and 7 of the drawings, are suitably mounted upon vertically disposed bearing pins 38 and 38', respectively, carried by the slide 29, said feed rolls lying upon either side of the solder wire 33 and adapted to clamp the same between them. The feed roll 37 has fixed to it a ratchet wheel 39, Figs. 1 and 5 of the drawings, which lies in a horizontal position above said feed rolls and the solder wire. A pawl 40, pivotally mounted at 41 upon the fixed guide member 22, is adapted to engage the teeth of said ratchet wheel 39 and is held in such engagement by a spring 42. A similar pawl 40', shown in Fig. 8, and in dotted lines in Figs. 4, 6 and 7 of the drawings, is pivotally mounted at 41' upon the bracket 21 and is held in engagement with the teeth of the ratchet wheel 39, at a point substantially opposite to the pawl 40, by a spring 42', Fig. 4 of the drawings. Thus it will be seen that as the slide 29 carrying the ratchet wheel 39 moves in and out, said ratchet wheel is caused to rotate intermittently by the pawls 40 and 40', thereby rotating the feed roll 37. A pair of coacting spur gears 43 and 43', mounted respectively upon the feed rolls 37 and 37', impart rotation from the feed roll 37 to the feed roll 37'. The feed roll 37' is not carried directly by the slide 29. The bearing pin 38' of said feed roll is fixed upon a horizontally disposed angle plate 44, Figs. 4, 6, 7 and 8 of the drawings, said angle plate being pivotally connected with the slide 29 at 45 and reciprocating therewith. The outer arm 44' of said angle plate carries an upstanding pin 46 which engages an eccentric slot 47 formed in the outer end of a horizontal plate 48 whose inner end is pivotally carried by the bearing pin 38 of the feed roll 37. The pin reciprocates the plate 48, its movement being longer than said slot. The slot 47 in said plate 48 is so formed that when said plate 48 is moved forwardly, that is from the position shown in Fig. 4 to that shown in Fig. 7, the angle plate 44 is drawn outwardly by means of its pin 46 and thereby moves the feed roll 37′ out of engagement with the solder wire 33, as shown in Fig. 7.

A fixed horizontal plate 49 is carried upon an angle bracket 50, Figs. 2 and 8 of the drawings, extending upwardly from the bracket 21, and upon said plate is a dog 51, pivotally mounted at 52 for swinging movement in a horizontal plane. Said dog has a concentric peripheral portion in which are formed a series of ratchet teeth 53, Figs. 1, 4, 6 and 7, and a lug 54. A pawl 55, pivotally mounted upon a bracket 56 fixed to the slide 29 and rising therefrom, is pressed by a spring 57 against a stop 58, and thereby held in a position to engage one of the teeth 53 of the dog 51 at each outward stroke of said slide 29, and by such engagement to move said dog to bring the next tooth 53 thereof into position for engagement with said pawl 55 upon the next outward stroke of the slide 29. Thus at each outward movement of said slide, the dog 51 is moved by an amount corresponding to one ratchet tooth 53, until it finally reaches the position shown in Fig. 7 of the drawings, with the lug 54 in the path of a pin 59 fixed on the arm 48, thus holding said arm from swinging outward and thereby holding the feed roll 37′ out of engagement with the solder wire 33, and stopping the feed of said solder. Further reciprocation of the slide 29 has no effect, therefore, upon the solder wire.

It will be seen from the drawings that there are five ratchet teeth 53 upon the feed control dog 51, this being the proper number for a machine adapted for four sided cans. The solder is allowed to feed for five complete strokes of the slide 29, that is, for one and one-quarter revolutions of the can chuck 9. The seam is thus soldered on all sides of the can, with sufficient overlap to insure its completion under all conditions.

A kicker arm 60 is provided, said kicker being pivotally mounted, at 61, upon the fixed plate 49 in proximity to the dog 51, and having one of its ends 62 adapted to engage and bear against a cam surface 63 on the dog 51, to give said dog a final rapid movement, during the last outward stroke of the slide 29, to insure the engagement of the lug 54 with the pin 59, and to hold said dog in its final position. A spring 64 is provided to actuate said kicker arm.

The solder feed mechanism is adapted to be reset by hand, and for this purpose the dog 51 is formed with an extension 65, by means of which it may be moved back to its initial position. The slotted plate 48 is then re-set to its initial position, thereby permitting the gripping of the solder wire 33 between the feed rolls 37 and 37′, for the feeding thereof for another one and one-quarter revolutions of the can chuck.

The can 11 may be placed upon the chuck 12 and removed therefrom by hand, or by any suitable placing means not shown in the drawings; and similarly, the rotation of said chuck may be controlled in any manner or by any means not shown. However, when the can has been placed upon the chuck, and the rotation thereof begun, the seam 10′ will be automatically soldered, the solder being fed for the proper time to completely solder said seam, and cut off at the end of such time, to prevent waste.

Having thus described my invention, what I claim as new and desire to protect by Letters Patent is:—

1. In a can soldering machine, means for receiving and holding a can having a seam to be soldered, means for fusing solder upon said seam, devices for automatically feeding a definite predetermined amount of solder thereto, and means corresponding with the shape of the can for actuating said feeding devices.

2. In a can soldering machine, means for receiving and holding a can having a seam to be soldered, devices for automatically reciprocating a solder strip toward and from the axis of the can and for fusing a definite predetermined amount of solder upon said seam, and means for controlling said reciprocating devices according to the peripheral shape of the can.

3. In a can soldering machine, means for receiving and holding a can having a seam to be soldered, means for fusing solder upon said seam, devices for feeding solder thereto, and a cam corresponding with the shape of the can for automatically controlling said feeding devices.

4. In a can soldering machine, means for receiving and holding a can having a seam to be soldered, means for fusing solder upon said seam, devices for feeding solder step-by-step thereto, and mechanism for throwing said feeding devices out of operation upon the completion of a predetermined number of said steps and of the seam.

5. In a can soldering machine, means for receiving and holding a can having a seam to be soldered, means for fusing solder upon said seam, rotary devices for feeding solder thereto, reciprocating means operating according to the peripheral shape of the can for actuating said rotary devices, and mechanism for automatically throwing said rotary devices out of operative relation with the solder.

6. In a can soldering machine for the soldering of end seams of cans having an angular peripheral contour, the combination of means for holding and rotating such a can body, a support movable toward and from the axis of the can body, means for maintaining said support at a varying distance from said axis, solder-feeding means carried on said support, and means for disengaging said feeding means from the solder.

7. In a can soldering machine for the soldering of end seams of cans having an angular peripheral contour, the combination of means for holding and rotating such a can body, a support movable toward and from the axis of the can body, means for maintaining said support at a varying distance from said axis, solder-feeding means carried on said support, and means for disengaging said feeding means from the solder at each outward movement of said support, and means for maintaining said disengagement after a predetermined number of movements of said support.

8. In a can soldering machine for the soldering of end seams of cans having an angular peripheral contour, the combination of means for holding and rotating such a can body, a support movable toward and from the axis of the can body, means for maintaining said support at a varying distance from said axis, solder-feeding means carried on said support, means for disengaging said feeding means from the solder, and means operated by said support for holding said feeding means disengaged after a certain number of operations of said support and irrespective of its further operation.

9. In a can soldering machine for the soldering of end seams of cans having an angular peripheral contour, the combination of means for holding and rotating such a can body, and a plurality of heating heads adapted to engage at each side of each angle of the can body in turn as said body is rotated, and means whereby said heating heads are caused to move toward and from the axis of the can body to maintain said heads in contact with the can body.

10. In a can soldering machine for the soldering of end seams of cans having an angular peripheral contour, the combination of means for holding and rotating such a can body, a flat sided oscillatory heating head adapted to engage at each side of each angle of the can body in turn as said body is rotated, and means whereby said heating head is caused to move toward and from the axis of the can body to maintain the flat side of said head in contact with the periphery of the can body.

11. In a can soldering machine for the soldering of end seams of cans having an angular peripheral contour, the combination of means for holding and rotating such a can body, a plurality of pivoted oscillatory heating heads adapted to engage at each side of each angle of the can body in turn as said body is rotated, and means whereby said heating heads are caused to move toward and from the axis of the can body to maintain said heads in contact with the can body.

12. In a can soldering machine for the soldering of end seams of cans having an angular peripheral contour, the combination of means for holding and rotating such a can body, a plurality of oscillatory heating heads adapted to engage at each side of each angle of the can body in turn as said body is rotated, and means comprising slides and springs whereby said heating heads are caused to move toward and from the axis of the can body to maintain said heads in contact with the latter.

13. In a can soldering machine for the soldering of end seams of cans having an angular peripheral contour, the combination of means for holding and rotating such a can body, a plurality of oscillatory heating heads adapted to engage at each side of each angle of the can body in turn as said body is rotated, and means comprising slides and slide-controlling springs and cam whereby said heating heads are caused to move toward and from the axis of the can body to maintain said heads in contact with the can body.

14. In a can soldering machine for the soldering of end seams of cans having an angular peripheral contour, the combination of means for holding and rotating such a can body, a plurality of heating heads adapted to engage at each side of each angle of the can body in turn as said body is rotated, means whereby said heating heads are caused to move toward and from the axis of the can body to maintain said heads in contact with the can body, a support movable toward and from the axis of the can body, means for maintaining said support at a varying distance from said axis, solder-feeding means carried on said support, and means for disengaging said feeding means from the solder.

15. In a can soldering machine, a rotatable chuck for holding a can having a seam to be soldered, means for fusing solder upon said seam, reciprocating devices actuated by the rotation of said chuck for feeding solder to said seam, and mechanism actuated by said reciprocating devices for throwing the same out of feeding relation with said solder upon the completion of said seam.

16. A can soldering machine comprising a rotatable chuck adapted to receive and hold a polygonal can having a seam to be soldered, a movable radially disposed member adapted to be reciprocated by the rotation of said chuck to follow the seam of the can, devices carried by said reciprocating member for feeding solder to said seam, and mechanism actuated by the reciprocation of said member for controlling the operation of said feeding devices.

17. A can soldering machine comprising a rotatable chuck adapted to receive and hold a polygonal can having a seam to be soldered, a movable radially disposed member adapted to be reciprocated by the rotation of said chuck to follow the seam of the can, means carried by said reciprocating member for supporting a strip of solder with its end in fusing relation with said seam, devices actuated by the reciprocation of said member for feeding said strip, and mechanism for automatically throwing said feeding devices out of operation upon the completion of the seam.

18. In a can soldering machine for the soldering of end seams of cans having an angular peripheral contour, the combination of means for holding and rotating such a can body, a support movable toward and from the axis of the can body, means for maintaining said support at a varying distance from said axis, solder-feeding means carried on said support, means for disengaging said feeding means from the solder, and fusing heads on which the can body has a sliding action at each side of the point of delivery of the solder.

19. In a can soldering machine for operating on angular cans, means for receiving and holding a can having a seam to be soldered, mechanism for feeding solder to said seam and fusing the same thereupon, and a pivotally mounted flat sided heating device adapted to turn the corners of the can and follow the contour of said seam with said flat side for the heating thereof, said means for holding the can and said heating device being relatively reciprocable toward and from each other.

20. In a can soldering machine for operating on angular cans, means for receiving and holding a can having a seam to be soldered, mechanism for feeding solder to said seam and fusing the same thereupon, a pivotally and a slidably mounted oscillatory flat-faced heating device adapted to turn from one side of the can to another side around the corners thereof and to be parallel with either side and follow the contour of said seam for the heating thereof, and means for actuating the slidable mounting of the heating device toward and from the axis of the can at the flat sides and corners of the can respectively.

21. In a can soldering machine for operating on angular cans, means for receiving and holding a can having a seam to be soldered, mechanism for feeding solder to said seam, and pivotally mounted oscillatory flat-faced devices adapted to turn from one side of the can to another side around the corners thereof and to be parallel with either side and follow the contour of said seam around the corners of the can for heating the same and fusing the solder thereon.

22. A can soldering machine comprising a rotatable chuck adapted to receive and hold a polygonal can having a seam to be soldered, means for feeding solder to said seam, a radially movable member adapted to be reciprocated by the rotation of said chuck to maintain a constant spaced relation between said member and the seam, and a head pivotally carried by said member and adapted to turn from one side of the can to another side around the corners thereof and to be parallel with either side and follow the contour of said seam for heating the same and fusing the solder thereon.

23. A can soldering machine comprising a rotatable chuck adapted to receive and hold a polygonal can having a seam to be soldered, means for feeding solder to said seam, a plurality of radially movable members adapted to be reciprocated by the rotation of said chuck to maintain a constant spaced relation between said members and the seam, burner heads pivotally carried by certain of said members and adapted to follow the contour of said seam for heating the same, fusing heads pivotally carried by the other members and adapted to follow the contour of said seam for fusing the solder thereon, means for supplying fuel to said burner heads, and means for heating said fusing heads.

24. In a can soldering machine for the soldering of end seams of cans having an angular peripheral contour, the combination of solder feeding devices, and means for causing said devices to be moved toward the can as a smaller radius of the same is presented and away from the can as a greater radius thereof is presented, whereby the solder is caused to approach the can surface during the first of said movements and the can surface is caused to approach the solder during the second of said movements.

25. In a can soldering machine for the soldering of end seams of cans having an angular peripheral contour, the combination of solder feeding devices, and means for causing said devices to be moved toward the can as a smaller radius of the same is presented and away from the can as a greater redius thereof is presented, whereby the solder is caused to approach the can surface during the first of said movements and the can surface is caused to approach the solder during the second of said movements, and automatic means for intermitting the feed of solder.

26. In a can soldering machine for the soldering of end seams of cans having an angular peripheral contour, the combination of solder feeding devices, and means for causing said devices to be moved toward the can as a smaller radius of the same is presented and away from the can as a greater radius thereof is presented, whereby the solder is caused to approach the can surface during the first of said movements and the can surface is caused to approach the solder during the second of said movements, and automatic means for stopping the feed of solder after the desired extent of revolution of the can.

27. In a can soldering machine for the soldering of end seams of cans having an angular peripheral contour, the combination of means for holding such can, devices for variably feeding solder to the surface of the same, and means for causing a relative rotation between the said holding means and said feeding devices, said feeding devices comprising rotary solder-gripping and advancing elements, means for separating said elements to release the solder and means for moving said elements toward and from the can.

28. In a can soldering machine for the soldering of end seams of cans having an angular peripheral contour, the combination of can-rotating means, solder-gripping and advancing rolls, and means for moving said rolls toward and from the can.

29. In a can soldering machine for the soldering of end seams of cans having an angular peripheral contour, the combination of a rotatable can holder, solder feeding means, and means for causing the advance of solder to be intermitted as the can surfaces of greater distance from the axis of rotation are presented to the solder.

30. In a can soldering machine for the soldering of end seams of cans having an angular peripheral contour, the combination of a rotatable can holder, solder feeding means acting to feed the solder in a substantially radial direction toward the axis of the can, and means for causing the advance of solder to be intermitted as the can surfaces of greater distance from the axis of rotation are presented to the solder.

31. In a can soldering machine adapted for operation on angular can bodies, the combination of means for receiving and holding a can body having a seam to be soldered, means for supplying solder to such seam to be melted thereon, a reciprocating and oscillatory heating head arranged at one side of a line from the center of said can body, and a second reciprocating and oscillatory heating head arranged at the other side of said line, said heating heads being adapted to embrace the corners of the can body successively as the latter is rotated.

32. In a can soldering machine the combination of means for holding a flat-sided can, a longitudinally extended heater having means whereby it may move toward or from the can and turn at different angles into parallelism with successive faces of the can, means for moving the heater nearer to and farther from the center of the can, and means for causing relative rotation between the can and the heater.

33. In a can soldering machine, a rotatable chuck for holding a can having a plurality of sides and a seam to be soldered, mechanism for feeding solder to said seam, and pivoted movable heating devices having inner elongated sides actuated by the rotation of said chuck to turn from one side of the can to another side around the corners thereof and to have said elongated sides parallel with either side and follow the contour of said seam around the corners of the can for heating the same and fusing the solder thereon.

34. In a can soldering machine for the soldering of end seams of cans having an angular peripheral contour, the combination of can rotating means, solder-gripping and advancing devices, means for moving said devices toward and from the can repeatedly during one revolution of the can, and means for causing said devices to intermit their solder-advancing action.

In testimony whereof I have signed my name to this specification in the presence of a subscribing witness.

ANTONIO ALVAREZ.

Witness:
N. A. ACKER.